Dec. 18, 1945.  I. W. FOLTZ  2,390,995
FURNACE
Filed Jan. 27, 1944  3 Sheets-Sheet 1
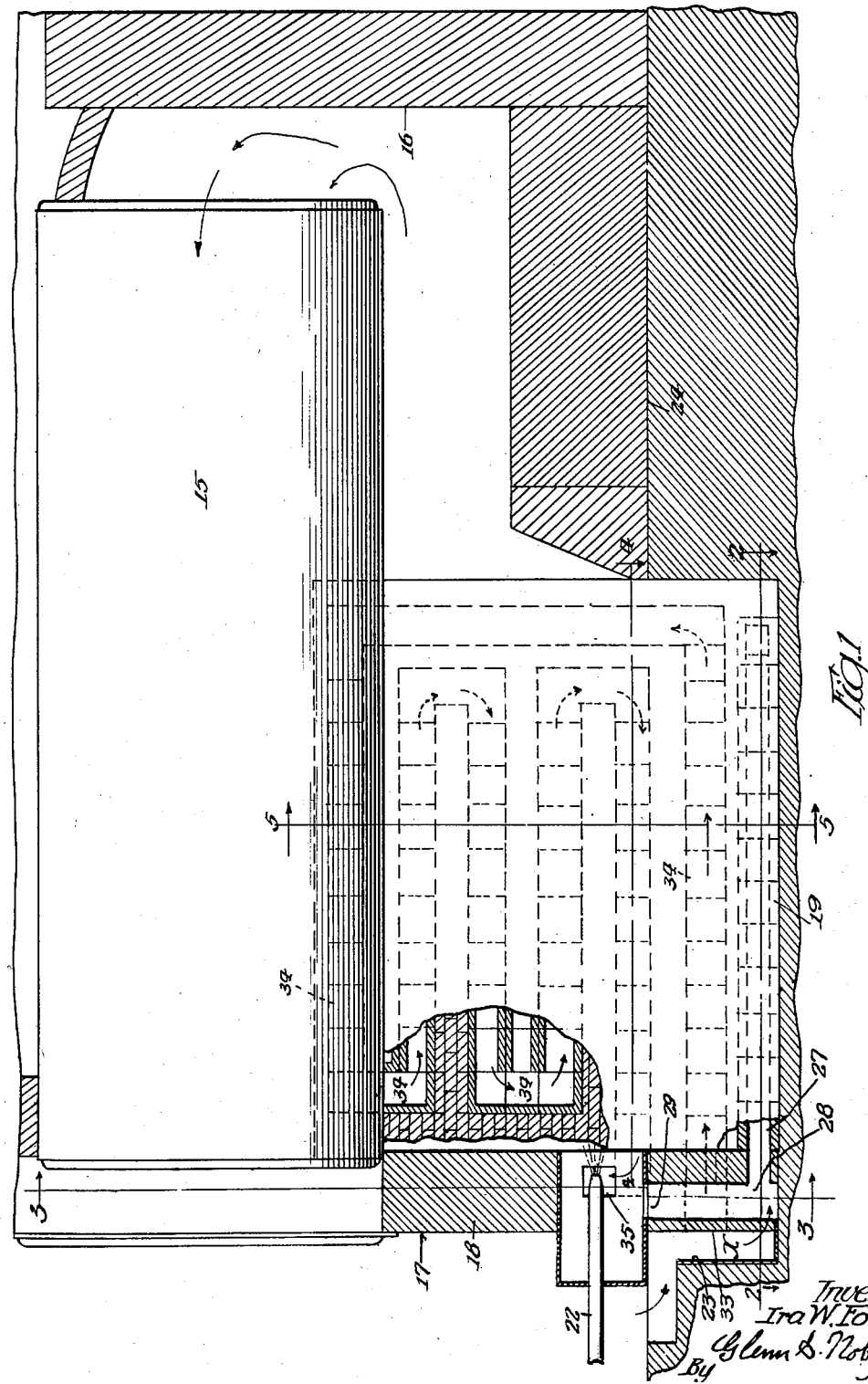

Dec. 18, 1945.  I. W. FOLTZ  2,390,995
FURNACE
Filed Jan. 27, 1944  3 Sheets-Sheet 2
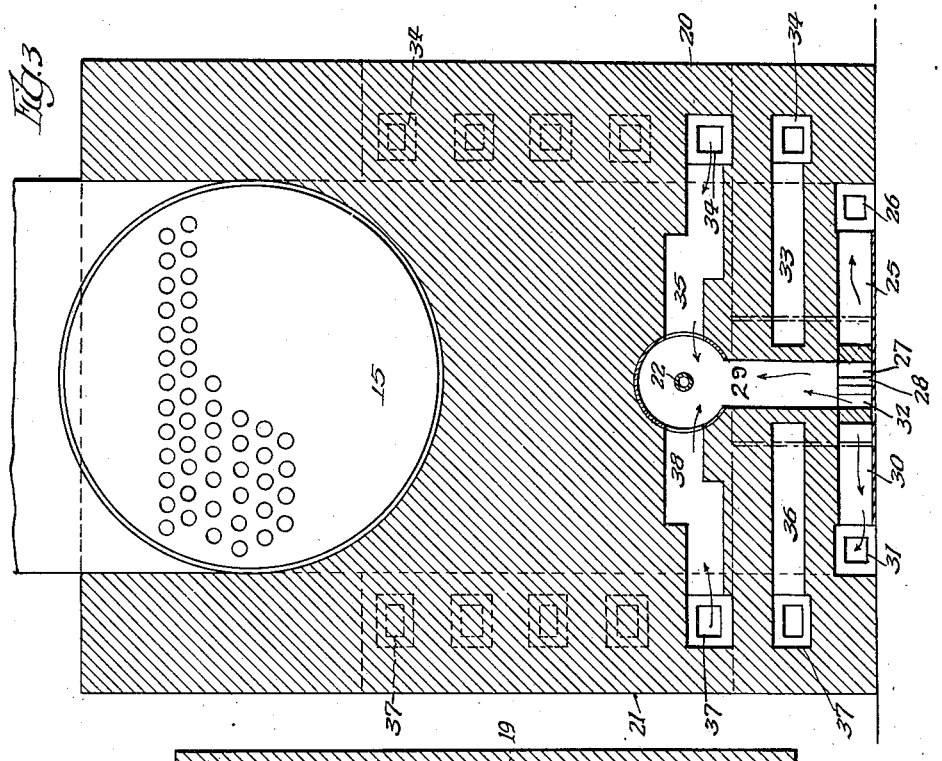
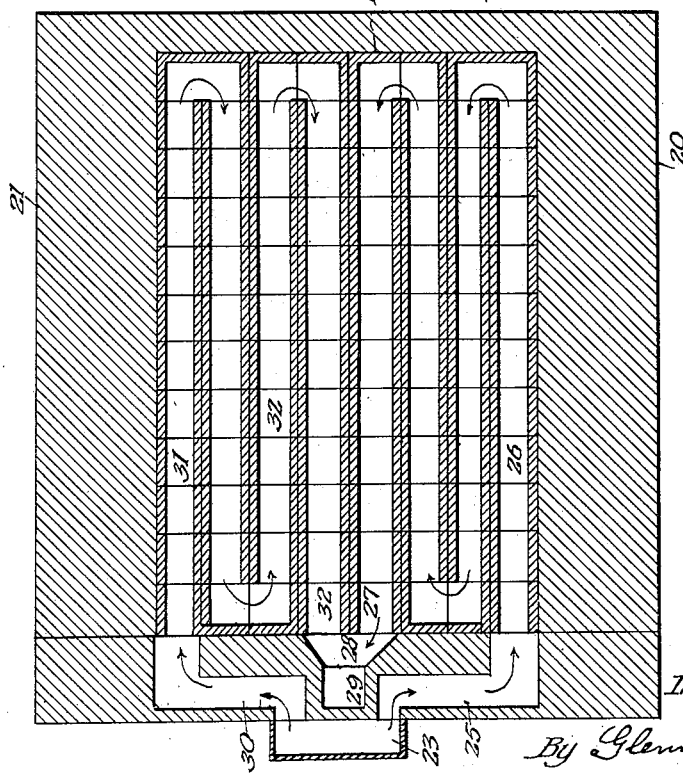

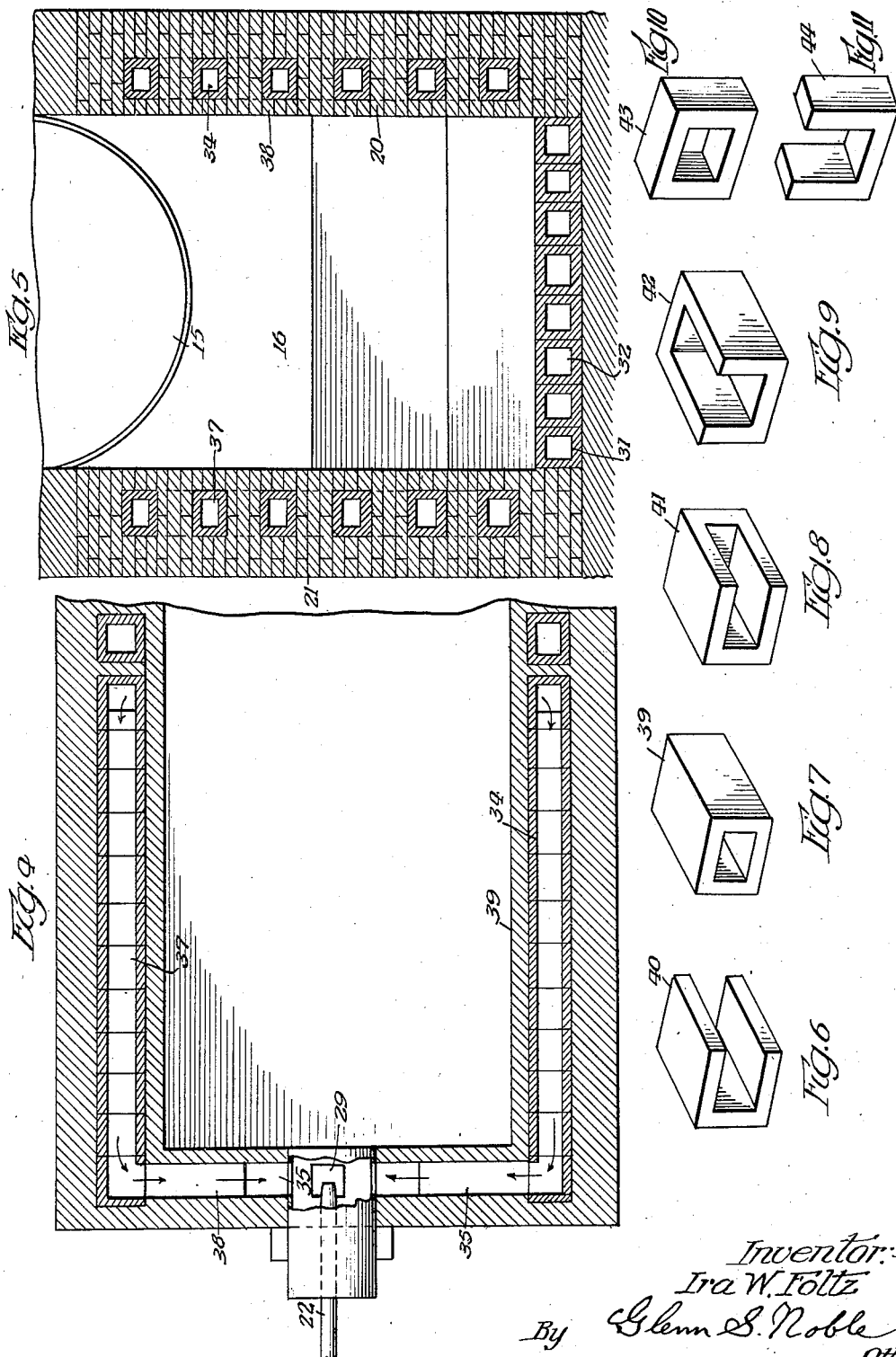

Patented Dec. 18, 1945

2,390,995

UNITED STATES PATENT OFFICE 2,390,995

FURNACE

Ira W. Foltz, Chicago, Ill.

Application January 27, 1944, Serial No. 519,867

4 Claims. (Cl. 110—1)

In the installation and utilization of the "Foltz Combustion System," I have heretofore used furnace brick or the materials usually used for constructing furnace walls, for making the desired conduits or passageways and inlet and outlet openings in the walls. However, the building of the walls in such manner requires considerable skill and the results obtained may not be uniform, particularly as to the desired areas and surfaces of the conduits. Furthermore, if the bricks forming the inner surface of the combustion chamber become injured or worn or reduced by the action of the fire, they may need to be replaced and when so replaced, the adjacent passageways may not be properly or easily rebuilt.

One of the particularly novel features of the present invention is the provision of a system of air heating conduits built in the furnace walls by the use of hollow blocks preferably made of high grade refractory material which remain permanently in the furnace brick work and by means of which preheated air is supplied to the furnace.

The objects of the present invention are to provide an improved furnace construction which will be efficient and durable in use; to provide a furnace with conduits or ducts in the walls thereof which will assist in supplying heated air to predetermined portions of the furnace; to provide means for improving the combustion in furnaces of substantially all kinds and utilizing various types of fuel; to provide furnace wall conduits for the purposes set forth which are made of refractory materials and which become permanent portions of the furnaces; to provide improved means for the proper distribution and application of the furnace air supply in order to obtain efficient combustion and to increase the capacity and reduce the amount of objectionable smoke, slag, clinkers, or the like, and to provide such other novel features in construction and advantages in operation as will appear more fully from the following description.

In the accompanying drawings illustrating this invention,

Figure 1 is a longitudinal, vertical sectional view showing an ordinary form of boiler and furnace setting;

Figure 2 is a sectional view taken substantially on the line 2—2 of Figure 1;

Figure 3 is a vertical cross sectional view taken substantially on the line 3—3 of Fig. 1;

Figure 4 is a horizontal sectional view taken substantially on the line 4—4 of Fig. 1;

Figure 5 is a transverse sectional view taken substantially on the line 5—5 of Fig. 1; and Figures 6 to 11 inclusive are perspective views showing different shapes of blocks which may be used in my improved construction.

In all of these views, parts are shown diagrammatically or omitted for convenience in illustration, such drawings being intended to show a comparatively simple application of the invention.

While my improved construction is adapted for use in various kinds of furnaces and in connection with furnaces using different fuels, the drawings are intended to represent a furnace heated by means of an oil burner. As shown in these drawings, 15 is a boiler of any ordinary or preferred construction which is mounted in the boiler setting 16 in the usual manner and which may be provided with any suitable connections and controlling apparatus (not shown). The boiler setting includes a combustion chamber or furnace 17 having a front wall 18, bottom 19, and side walls 20 and 21. The furnace is heated by means of an oil burner as indicated at 22, and the products of combustion travel through the furnace and boiler and are discharged through the breeching or stack in the usual manner.

In the present instance, I provide means for supplying additional heated air to the furnace by means of a plurality of conduits or passageways. An air inlet opening 23 preferably positioned in the floor beneath the oil burner and in front of the front wall is best shown in Figs. 1 and 2, it being understood that the floor line 24 in this instance is just below the fuel inlet opening. One conduit or duct 25 leads from the inlet opening 23 to a conduit 26 positioned in the floor or furnace bottom 19 and which extends back and forth to provide an elongated labyrinth having an outlet 27 that leads to a vertical passageway or riser 28 having an outlet orifice 29 opening upwardly into the space immediately below the burner 22.

The inlet opening 23 is also connected by means of a short passageway 30 with another conduit or duct 31 which is similar to the conduit 26 and passes back and forth along the bottom of the furnace as shown in Fig. 2 with its outlet 32 leading to the vertical passageway 28 having the outlet orifice 29. It will be seen that this provides a double air circulating system whereby heat will be withdrawn from the floor or bottom of the furnace and hot air provided for combustion as will presently be explained.

The air intake 23 is also connected with a lateral passageway 33 that leads to a conduit or duct 34 which is positioned in the side wall 20 and extends horizontally to the rear portion of the furnace and then up and around by a circuitous path as indicated and finally terminates in an outlet 35 that leads into the fuel opening at one side of the burner as shown in Fig. 3.

The air inlet 23 is also connected by means of a lateral conduit or passageway 36 with a conduit 37 which is similar to the conduit 34 and which passes back along the bottom of the side wall 21 and then up and back and forth as shown in Fig. 1 and has an outlet 38 which leads into the opening around the burner on the side opposite from the opening 35 as shown in Fig. 3.

It will be readily seen that as the furnace walls become heated, relatively cold air will pass in from the intake 23 to the respective conduits 34 and 37 and will become sufficiently heated so that when it is discharged into the combustion chamber, it will mingle with the primary air supply of the burner and tend to improve the combustion. This is also true of the air supplied by the conduits 26 and 31 as above described.

It is apparent that such conduits with their inlet and outlet openings may be arranged in various ways for different types of furnaces in order to produce the best results. For instance, in a coal burning furnace, it is often desirable to provide outlets to permit heated air to enter the combustion chamber at points above the burning fuel or to provide additional oxygen for burning the carbon monoxide or other gases produced in the first stages of combustion.

In accordance with the present invention, the conduits and passageways above described are preferably formed by means of special blocks such as shown in Figs. 6 to 11 inclusive. These blocks are preferably made of refractory material so that they are practically indestructible, being fully protected by being imbedded throughout in the walls of the furnace. These blocks are preferably made in sizes which are complementary to the sizes of the bricks used in the furnace construction or so that the blocks may be readily built in with the wall construction. In common commercial practice, such bricks are approximately 2½ inches thick, 4½ inches wide and 9 inches long. The bricks 38 on the inside of the walls form a relatively thin layer, adjacent to the blocks, preferably the width of the bricks as shown in Fig. 5 so that the heat may be readily transmitted to the blocks. Furthermore, if these bricks become worn or partially destroyed during the operation of the furnace, they may be readily renewed without disturbing the blocks which are permanently imbedded in the walls.

The blocks 39 as shown in Fig. 7 are the ones principally used in making the main reaches of the several conduits. The other blocks such as indicated at 40, 41, 42, 43 and 44 are utilized in making the turns or bends and outlets as will be readily understood from the several figures. These blocks are sufficient for the usual conditions encountered in a furnace, but it is evident that other shapes may be utilized if desired, for the purposes indicated. When the conduits are all made of blocks of the same material, they may be of uniform construction and will have smooth surface walls which permit the free passage of the air therethrough.

Having thus described my invention, what I claim is:

1. A furnace wall made of commercial bricks and having a conduit therein formed of a plurality of hollow rectangular blocks of uniform size made of refractory material, said conduit being entirely enclosed in the wall and the bricks on the inside of the wall adjacent to the blocks comprising a relatively thin layer covering the conduit which may be readily replaced without interfering with the conduit.

2. A furnace wall made of bricks commonly used for such purposes and provided with a conduit formed of hollow rectangular blocks of refractory material, the transverse dimensions of which are complemental with the dimensions of the bricks whereby each block will fill a space equal to a predetermined number of bricks, there being a plurality of tiers of bricks in the wall on the outside of the blocks, and a single tier of bricks on the inside of the blocks of approximately the width of such bricks, the construction being such that the portions of the wall on the inside of the blocks may be readily replaced after they have become worn, without disturbing the blocks, said blocks forming a permanent portion of the wall, substantially as described.

3. A furnace wall having a system of hollow blocks therein made of high grade refractory material, each block formed and shaped in size in multiples of commercial standard furnace fire brick which are substantially 2½ inches thick, 4½ inches wide and 9 inches long, forming a permanent continuous unbroken conduit encased in the wall and having horizontally and vertically disposed reaches which are connected by angular connections also formed of high grade refractory material, the same as the blocks.

4. A furnace wall formed of commercial fire bricks, having a conduit therein for the passage of air, said conduit being formed substantially of rectangular, hollow blocks laid to provide a continuous passageway, the transverse dimensions of said blocks being substantially multiples of certain dimensions of the bricks whereby each block will take the place of a predetermined number of bricks, the bricks on the inside of the blocks being laid in stretcher formation to provide layers 4½ inches thick at such points and the bricks between the blocks being laid in header formation, some of said bricks extending in to form portions of the inner walls of the furnace.

IRA W. FOLTZ.